(12) United States Patent
Chen et al.

(10) Patent No.: US 10,545,550 B2
(45) Date of Patent: Jan. 28, 2020

(54) POWER-UP CONTROL CIRCUIT AND MOBILE POWER BANK

(71) Applicant: Delta Electronics, Inc., Taoyuan (TW)

(72) Inventors: Tien-He Chen, Taoyuan (TW); Che-Min Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 215 days.

(21) Appl. No.: 15/843,746

(22) Filed: Dec. 15, 2017

(65) Prior Publication Data

US 2018/0275732 A1 Sep. 27, 2018

(30) Foreign Application Priority Data

Mar. 22, 2017 (TW) .............................. 106109496 A

(51) Int. Cl.
*G06F 1/30* (2006.01)
*G06F 1/26* (2006.01)

(52) U.S. Cl.
CPC ...... *G06F 1/263* (2013.01); *G06F 2213/0042* (2013.01)

(58) Field of Classification Search
CPC ..................................... G06F 1/30; G06F 1/26
USPC ........................................................... 710/10
See application file for complete search history.

(56) References Cited

U.S. PATENT DOCUMENTS

| 8,157,180 | B2 | 4/2012 | Cho |
| 9,336,170 | B2 | 5/2016 | Hong et al. |
| 9,405,307 | B2 | 8/2016 | Spalding, Jr. et al. |
| 9,948,094 | B1* | 4/2018 | Sheng ...................... H02J 1/00 |
| 10,409,311 | B2* | 9/2019 | Leinonen ................ G05F 3/02 |
| 2015/0106641 | A1* | 4/2015 | Leinonen ........... G06F 13/4063 713/340 |
| 2015/0268688 | A1* | 9/2015 | Leinonen ............. G06F 13/409 307/147 |
| 2017/0060216 | A1* | 3/2017 | Waters ...................... G06F 1/30 |
| 2017/0093154 | A1* | 3/2017 | Geng ...................... H02M 7/04 |
| 2017/0220090 | A1* | 8/2017 | Kim ........................ G06F 1/10 |
| 2017/0277251 | A1* | 9/2017 | Gong .................... G06F 13/362 |
| 2017/0344098 | A1* | 11/2017 | Abu Hilal ............. G06F 1/3287 |

(Continued)

OTHER PUBLICATIONS

Google Search using searh terms of the claims, pp. 1-13.*

*Primary Examiner* — Christopher B Shin
(74) *Attorney, Agent, or Firm* — Muncy, Geissler, Olds & Lowe, P.C.

(57) ABSTRACT

A power-up control circuit is provided and includes a pull-down resistor, a pull-down switch, and an enable device. A first terminal of the pull-down resistor is electrically connected to a configuration channel pin of a USB Type-C connection port. The pull-down switch is electrically connected to a second terminal of the pull-down resistor and a ground node. The enable device is electrically connected to the pull-down switch and the configuration channel pin. When receiving a voltage detection signal which is transmitted by a dual-role port device through the configuration channel pin, the enable device turns on the pull-down switch to electrically connect the pull-down resistor to the ground node, so that the dual-role port device detects the pull-down resistor through the configuration channel pin and supplies power to the microcontroller through a power supply pin to keep the microcontroller in the power-up status.

16 Claims, 4 Drawing Sheets

(56) References Cited

U.S. PATENT DOCUMENTS

2018/0074574 A1\* 3/2018 Camiolo ............... G06F 1/3287
2018/0123594 A1\* 5/2018 Kim ..................... H03K 19/003

\* cited by examiner

POWER-UP CONTROL CIRCUIT AND MOBILE POWER BANK

CROSS REFERENCE TO RELATED APPLICATIONS

This Application claims priority of Taiwan Patent Application No. 106109496, filed on Mar. 22, 2017, the entirety of which is incorporated by reference herein.

BACKGROUND OF THE INVENTION

Field of the Invention

The invention relates to a power-up control circuit, and more particularly to a power-up control circuit which operates to keep a microcontroller in a power-up status.

Description of the Related Art

Nowadays, people are gradually coming to rely on mobile devices such as smartphones and tablet PCs. In addition, there are many mobile devices whose batteries are designed to be recharged in-situ, rather than replaced. Many users carry mobile power banks to charge their mobile devices in order to use the mobile devices for a long time. Thus, a mobile device which supports fast charge/discharge and bidirectional charge/discharge and conforms to the USB Type-C specification is an important option for users. The present invention proposes a power-up control circuit which can support a specific function of a USB Type-C mobile device.

BRIEF SUMMARY OF THE INVENTION

Thus, the invention provides a readout circuit which can reduce current consumption.

The present invention is provided for a product related to a USB Type-C power delivery (PD) technology, such as a mobile power bank. In a dead battery mode of the mobile power bank, the microcontroller of the mobile power bank does not work. At this time, the battery and the microcontroller of the mobile power bank can be charged by the 5-V (volts) voltage (SSafe5v) provided from an external dual-role port (DRP) system through the power-up control circuit provided in the present invention. After the mobile power bank receives a certain amount of power, then a PD communication may be performed according to requirements.

An exemplary embodiment of a power-up control circuit is provided. The power-up control circuit connects to a dual-role port device through a universal serial bus Type-C connection port to keep a microcontroller in a power-up status. The power-up circuit comprises a pull-down resistor, a pull-down switch, and an enable device. The pull-down resistor has a first terminal and a second terminal. The first terminal of the pull-down resistor is electrically connected to a configuration channel pin of the universal serial bus Type-C connection port. The pull-down switch is electrically connected to the second terminal of the pull-down resistor and a ground node. The enable device is electrically connected to the pull-down switch and the configuration channel pin. The enable device comprises a diode and a capacitor. The diode has an anode electrically connected to the configuration channel pin and a cathode electrically connected to a control terminal of the pull-down switch. The capacitor is electrically connected between the control terminal of the pull-down switch and the ground node. When the enable device is configured to receive a voltage detection signal transmitted by the dual-role port device through the configuration channel pin, the enable device is figured to turn on the pull-down switch to electrically connect the pull-down resistor to the ground node. When the voltage detection signal is at a high voltage level, the diode is turned on to charge the capacitor to a first voltage level applied to turn on the pull-down switch. When the voltage detection signal is at a low voltage level, the diode is turned off and a cross voltage of the capacitor keeps on the first voltage level to turn on the pull-down switch.

An exemplary embodiment of a mobile power device is provided. The mobile power device comprises a first universal serial bus Type-C connection port, a microcontroller, and a first power-up control circuit. The first universal serial bus Type-C connection port comprises a first configuration channel pin and a first power supply pin. The microcontroller is electrically connected to the first configuration channel pin and the first power supply pin. The first power-up control circuit is electrically connected to a first dual-role port device through the first universal serial bus Type-C connection port. The first power-up control circuit comprises a first pull-down resistor, a first pull-down switch, and a first enable device. The first pull-down resistor has a first terminal and a second terminal. The first terminal of the first pull-down resistor is electrically connected to the first configuration channel pin. The first pull-down switch is electrically connected to the second terminal of the first pull-down resistor and a ground node. The first enable device is electrically connected to the first pull-down switch and the first configuration channel pin. The first enable device comprises a first diode and a first capacitor. The first diode has an anode electrically connected to the configuration channel pin and a cathode electrically connected to a control terminal of the first pull-down switch. The first capacitor is electrically connected between the control terminal of the first pull-down switch and the ground node. When the first enable device is configured to receive a first voltage detection signal transmitted by the first dual-role port device through the first configuration channel pin, the first enable device is configured to turn on the first pull-down switch to electrically connect the first pull-down resistor to the ground node When the first voltage detection signal is at a first high voltage level, the first diode is turned on to charge the first capacitor to a first voltage level applied to turn on the first pull-down switch. When the first voltage detection signal is at a first low voltage level, the first diode is turned off and a cross voltage of the first capacitor keeps on the first voltage level to turn on the first pull-down switch.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

This description is made for the purpose of illustrating the general principles of the invention and should not be taken in a limiting sense. One skilled in the art should be able to know that it can be changed, replaced and replaced without departing from the spirit and structure of the present disclosure. In the disclosed embodiments, the symbols of the elements may be used repeatedly, and several embodiments of the present disclosure may share the same element symbols, but the feature elements used in one embodiment are not necessarily used for another embodiment.

Figure 1:
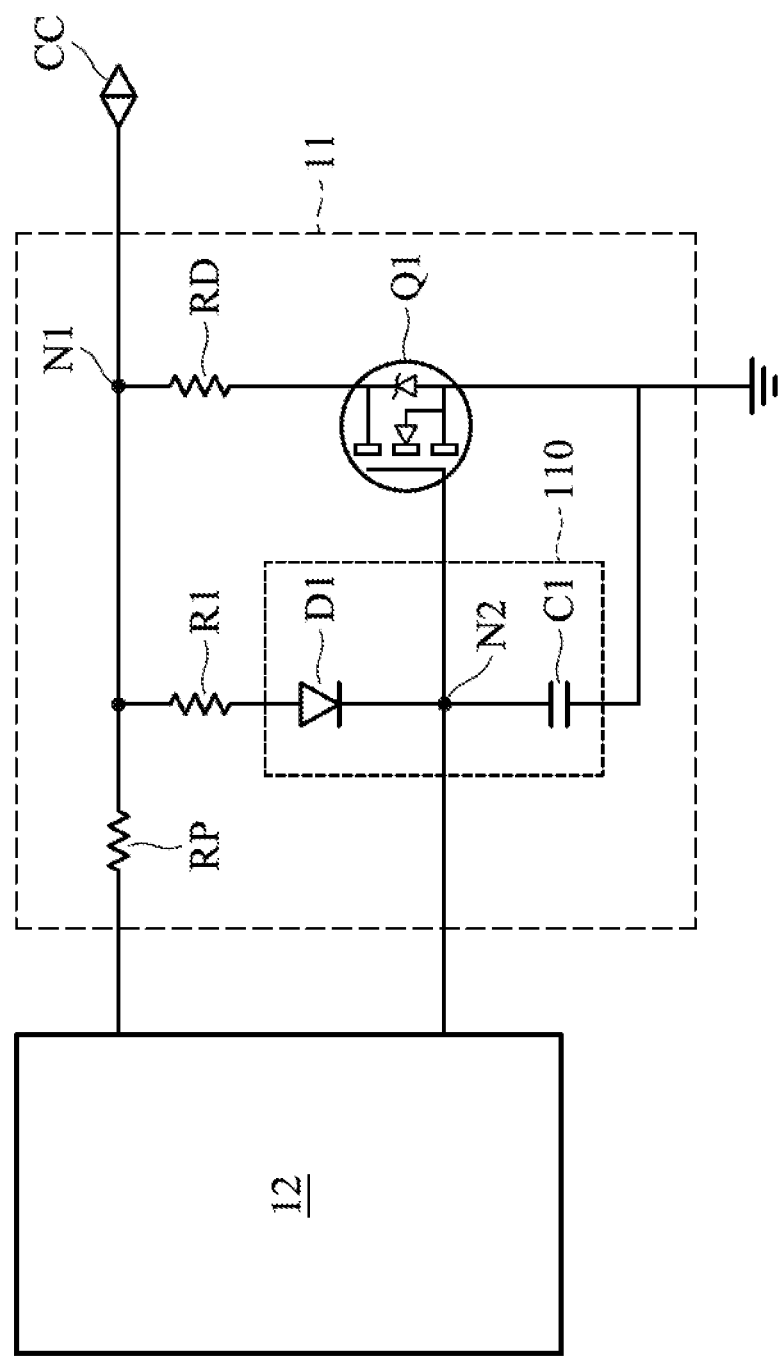
FIG. 1 shows an exemplary embodiment of a power-up control circuit 11.

FIG. 1 shows an exemplary embodiment of a power-up control circuit. In the embodiment, the power-up control circuit 11 is electrically connected to a microcontroller 12 and receives a voltage detection signal which is transmitted from a configuration channel pin (referred to as "CC pin") of a universal serial bus Type-C connection port or socket (referred to as "USB Type-C socket"). The voltage detection signal may be a square-wave signal or a detection signal in other types. In the USB Type-C specification, the CC pin can be the CC1 pin or CC2 pin among the twenty-four pins. A CC pin can be used to detect connection between USB Type-C apparatuses, detect the insertion orientation (positive or reversed orientation) between a USB Type-C socket and a corresponding USB Type-C plug, and manage and establish communication of the data and VBUS between USB Type-C apparatuses. The power-up control circuit 11 can connect to an external dual-role port device through a universal serial bus Type-C connection port.

In the embodiment, the power-up control circuit 11 and the microcontroller 12 are two of the components composed of a power-bank device, for example, without limitation to the invention. In another embodiment, the power-up control circuit 1 and the microcontroller 12 are two of the components in a power-bank device, a transition card, a computer apparatus, or any other type of dual-role port (DRP) devices. In the embodiment, the microcontroller 12 can be implemented by a logic circuit. In other embodiments, the microcontroller 12 can be implemented by a micro-processor, an analog integrated circuit, an application-specific integrated circuit (ASIC), a field programmable gate array (FPGA), and a digital signal processor (DSP) chip.

In the embodiment, the power-up control circuit of the power-bank device is configured to keep the microcontroller 12 of the power-bank device in a power-up status when an external dual-role port device is inserted into the USB Type-C socket of the power-bank device, thereby avoiding a situation wherein the microcontroller 12 does not work when the power-bank device is in a dead battery mode.

In the embodiment, the power-up control circuit 11 comprises a pull-down resistor RD, a pull-up resistor RP, a resistor R1, a pull-down transistor Q1, and an enable device 110 formed by a diode D1 and a capacitor C1. The pull-down transistor Q1 can be a bipolar transistor or a unipolar transistor (field-effect transistor). As shown in FIG. 1, the first terminal of the pull-down resistor RD is electrically connected to a CC pin of a USB Type-C socket through a first node N1 to receive the voltage detection signal which is sent to the CC pin by the aforementioned external dual-role port device. The terminals of the pull-up resistor RP are electrically connected to the microcontroller 12 and the first node N1 respectively. The terminals of the pull-down transistor Q1 are electrically connected to the pull-down resistor RD, a second node N2, and a ground node. The anode of the diode D1 is electrically connected to the CC pin through the first node N1, and the cathode of the diode D1 is electrically connected to the second node N2.

When the enable device 110 receives a voltage detection signal which is transmitted by the dual-role port device through the configuration channel (CC) pin, the enable device 110 turns on the pull-down transistor Q1 to electrically connect the pull-down resistor R1 to the ground. In the embodiment, when the pull-down transistor Q1 is turned on, the pull-down transistor Q1 pulls a second terminal of the pull-down resistor RD down to a ground voltage level GND. When the voltage detection signal is at a high voltage level, the diode D1 is turned on to charge the first terminal of the capacitor C1 to a first voltage (that is, the second node N2 is charged to the first voltage). The first voltage is applied to turn on the pull-down transistor Q1. When the voltage detection signal is at a low voltage level, the diode D1 is turned off, and the cross voltage of the capacitor C1 keeps on the first voltage to turn on the pull-down transistor Q1.

In the embodiment, when the external dual-role port device detects that the pull-down resistor RD is pulled down to the ground voltage level GND through the voltage detection signal, the dual-role port device supplies power to the microcontroller 12 through the USB Type-C socket of the mobile power bank, so that the microcontroller 12 remains in the power-up status. Thus, regardless of whether the voltage detection signal is at the high voltage level or the low voltage level, the mobile power device can allow the external dual-role port device through the power-up control circuit 11 to detect the pull-down resistor RD of the mobile power bank through the power. Thus, according to the detection result in which the pull-down resistor RD is detected, the external dual-role port device serves as a downstream-facing port (DFP) device (also referred to as "source") and determines that the mobile power bank connected to the dual-role port device is an upstream-facing port (UFP) device (also referred to as "sink"). At this time, the downstream-facing port device supplies power to the microcontroller 12 of the mobile power bank through a VBUS pin of the USB Type-C socket, so that microcontroller 12 remains in the power-up status and operates normally. The normal operation of the microcontroller 12 ensures that the mobile power bank can correctly detect an electronic device which externally connects to the mobile power bank.

In the embodiment, the purpose of keeping the microcontroller 12 in the power-up status is that, in cases where the mobile power bank does not have any power, once the external dual-role port device connects to the mobile power bank, the external dual-role port device can immediately supply power to the microcontroller 12, so that the microcontroller 12 remains in the power-up status and operates normally.

In the embodiment of FIG. 1, if the power-up control circuit 11 does not comprise the diode D1 and the capacitor C1 and the detection period of the external dual-role port device is low (that is, the voltage detection signal is at a low voltage level), at this time, the pull-down transistor Q1 is turned off (not turned on), so that the external dual-role port device does not detect the pull-down resistor RD and disables on the VBUS pin. More specifically, at this time, the pull-down transistor Q1 is turned off (not turned on), so that the external dual-role port device does not detect the pull-down resistor RD and further does not supply power to the microcontroller 12. Thus, the diode D1 and the capacitor C1 of the power-up control circuit 11 are configured to ensure that the eternal dual-role port device can continuously detect the pull-down resistor RD and supply power to the microcontroller 12.

Figure 2:
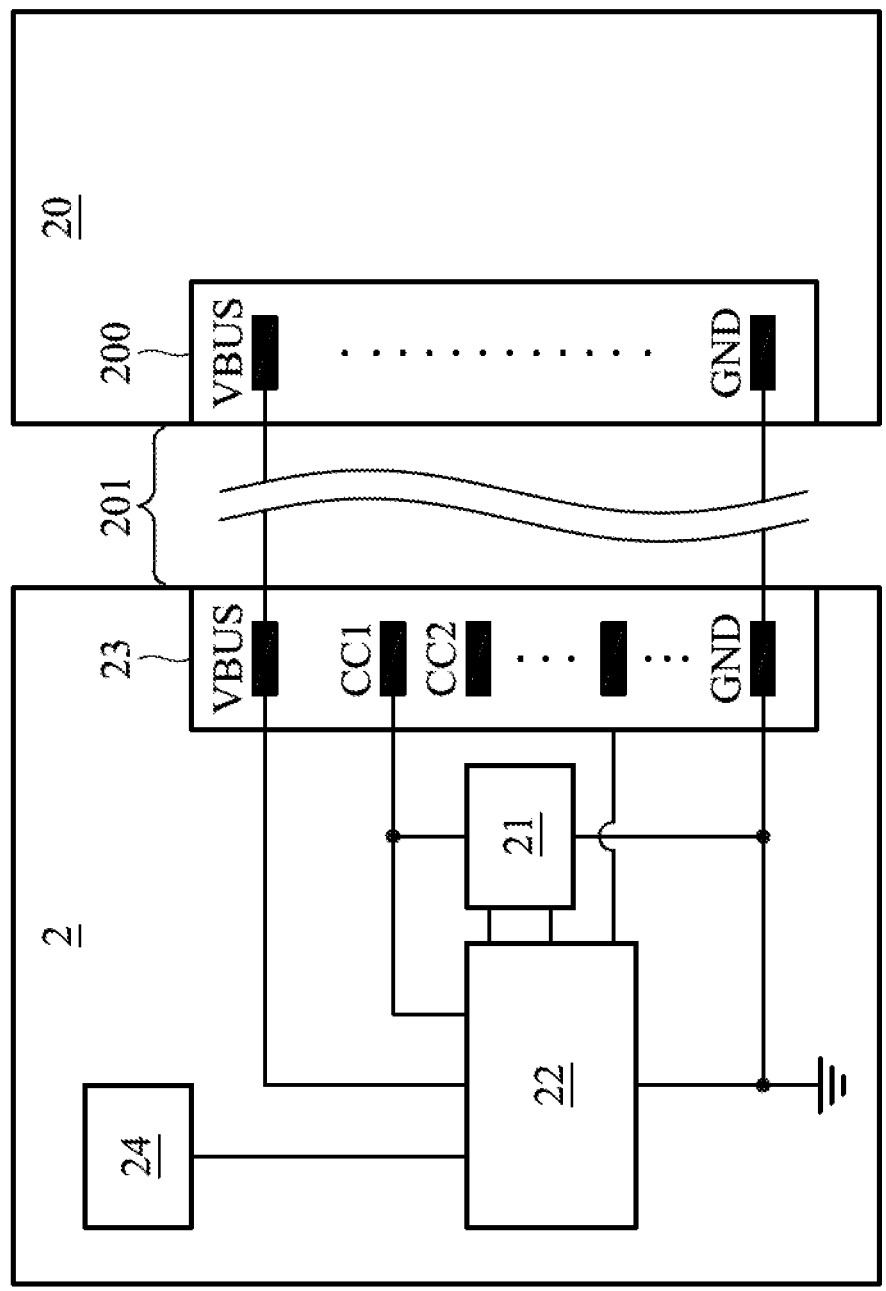
FIG. 2 shows an exemplary embodiment of a mobile power bank 2.

FIG. 2 shows an exemplary embodiment of a mobile power bank 2. In the embodiment of FIG. 2, the mobile power bank 2 comprises a power-up control circuit 21, a microcontroller 22, a USB Type-C socket 23, and a display device 24. An external dual-role port device 20A connects to the USB Type-C socket 23 of the mobile power bank 2 through a USB Type-C connector 201. The microcontroller 22 is electrically connected to the power-up control circuit 21, the USB Type-C socket 23, and the display device 24. In the embodiment, the system shown in FIG. 2 is not limited to a mobile power bank. In other embodiments, the system shown in FIG. 2 can be a transition card, a computer apparatus, or any other type of dual-role port device.

In the embodiment, the internal component of the power-up control circuit 21 corresponds to the components of the power-up control circuit 11 in the above embodiment. In other words, the power-up control circuit 21 of the mobile power bank 2 comprises all components of the power-up control circuit shown in FIG. 1 and performs all the operations of the power-up control circuit 11. The microcontroller 22 can be a logic circuit disposed in the mobile power bank 2. In other embodiments, the microcontroller 22 can be a micro-processor, an analog integrated circuit, an application-specific integrated circuit (ASIC), a field programmable gate array (FPGA), and a digital signal processor (DSP) chip of a dual-role port device. The display device 24 can be a liquid-crystal display or a display sign (such as an LED sign), for example, without limitation to the present invention.

In the embodiment, the power-up control circuit 21 of the mobile power bank 2 operates to keep the mobile power bank 2 in the power-up status at all times when the external dual-role port device 20 connects to the USB Type-C socket 23 of the mobile power bank 2 through the USB Type-C connector 201, which prevents the microcontroller 22 of the mobile power bank 2 from operating in a low-power mode.

In the embodiment, one purpose of keeping the microcontroller 22 in the power-up status is that, in cases where the mobile power bank 2 does not have any power, once the external dual-role port device 20 connects to the mobile power bank, the external dual-role port device 20 can immediately supply power to the microcontroller 22, so that the microcontroller 22 remains in the power-up status and operates normally. Another purpose of keeping the microcontroller 22 in the power-up status is that the microcontroller 22 can report the current power level of the mobile power bank 2 to the user via a display device 24 (such as a liquid-crystal display) of the mobile power bank 2. Thus, when the mobile power bank 2 does not have any power, the user can receive information indicating that the mobile power bank 2 is currently in a low-power mode, or information about the power level of the battery of the mobile power bank 2, once the user connects the external dual-role port device 22 to the mobile power bank 2.

Figure 3:
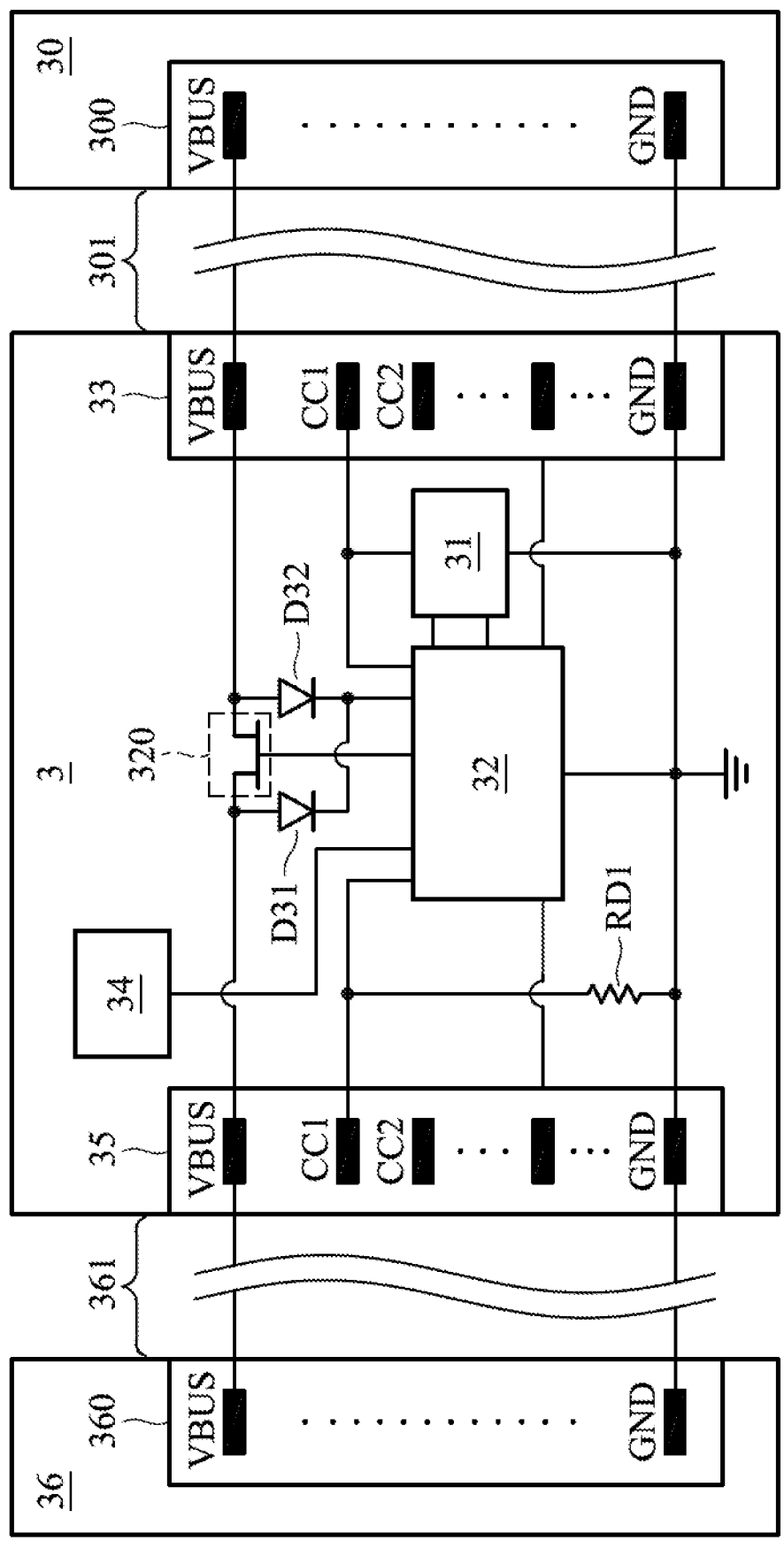
FIG. 3 shows an exemplary embodiment of a mobile power bank 3.

FIG. 3 shows an exemplary embodiment of a mobile power bank 3. In the embodiment shown in FIG. 3, the mobile power bank 3 comprises a power-up control circuit 31, a microcontroller 32, a USB Type-C socket 33, a USB Type-C socket 35, a pull-down resistor RD1, a diode D31, a diode D32, and a display device 34. An external dual-role port device 30 connects to the USB Type-C socket 33 of the mobile power bank 3 through a USB Type-C connector 301, and a downstream-facing port device 36 connects to the USB Type-C socket 35 of the mobile power bank 3 through a USB Type-C connector 361. The system shown in FIG. 3 is not limited to a mobile power bank. In other embodiments, the system shown in FIG. 3 can be a transition card, a computer apparatus, or any other type of dual-role port device.

Like the mobile power bank 2 shown in FIG. 2, the power-up control circuit 31, the microcontroller 32, the USB Type-C socket 33, and the display device 34 of the mobile power bank 3 correspond to the power-up control circuit 21, the microcontroller 22, the USB Type-C socket 23, and the display device 24 of the mobile power bank 2 respectively. Thus, the mobile power bank 3 can perform all the circuit operations of the mobile power bank 2.

In the embodiment, the downstream-facing port device 36 is implemented by a source adapter, for example, without limitation to the prevent invention. The downstream-facing port device 36 supplies power to the mobile power bank 3 through the VBUS pin of the USB Type-C socket 360. The pull-down resistor RD1 is configured to allow the mobile power device 3 to only obtain power from the USB C-type socket 35 but not supply power to an external electronic device through the USB C-type socket 35. In other words, an electronic device (such as an external dual-role port device) connecting to the USB C-type socket 35 can only detect the occurrence of the pull-down resistor RD1 and determine that the mobile power bank 3 is an upstream-facing port device. On the contrary, by applying other mechanisms, the microcontroller 32 of the mobile power bank 3 can allow an external electronic device, which connects to USB Type-C socket 33, to detect the pull-up resistor of the mobile power bank 3 and further determine that the mobile power bank 3 is an upstream-facing port device.

In the embodiment, compared with the mobile power bank 2, the mobile power bank 3 further comprises a bridge transistor 320, a diode 31D, and a diode D42. The microcontroller 32 is electrically connected to the gate of the bridge transistor 320. The microcontroller 32 controls the bridge transistor 320 to decide whether the VBUS pin of the external dual-role port device 30 connects to the VBUS pin of the downstream-facing port device 36. The diode D31 and the diode D32 are configured to prevent the power provided by one of the two sides (the external dual-role port device 30 and the downstream-facing port device 36) from being supplied to the other side when the bridge transistor 420 is not turned on, thereby protecting the apparatuses on the two sides.

In the embodiment, if the bridge transistor 320 serves as a bridge element and one of the external dual-role port device 30 and the downstream-facing port device 36 serves as a downstream-facing port device (source), once the downstream-facing port device (source) connects to the mobile power bank 3, the microcontroller 32 obtains stable power. At this time, the bridge transistor 320 is turned on.

In the embodiment, if the external dual-role port device 30 serves as an upstream-facing port device (sink) and connects to the mobile power bank 3, the microcontroller 32 only obtains the power required to maintain the operation but does not turn on the bridge transistor 320. After a downstream-facing port device (source) connects to the mobile power bank 3 and stable power is supplied, then the microcontroller 32 turns on the bridge transistor 320 and controls the external dual-role port device to switch to the downstream-facing port device (source) from the upstream-facing port device (sink) for supplying power.

Figure 4:
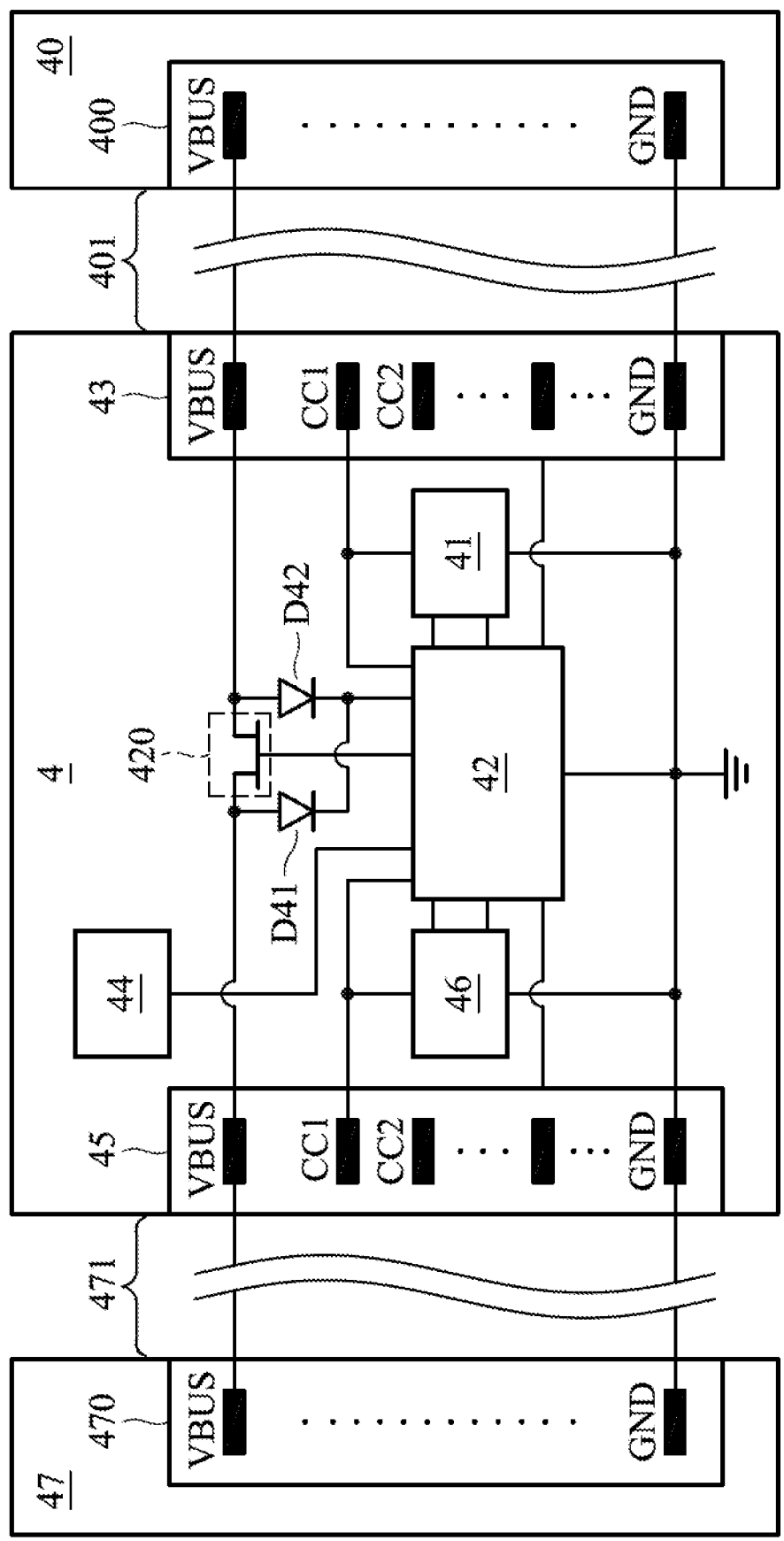
FIG. 4 shows an exemplary embodiment of a mobile power bank 4.

FIG. 4 shows an exemplary embodiment of a mobile power bank 4. In the embodiment shown in FIG. 4, the mobile power bank 4 comprises a power-up control circuit 41, a microcontroller 42, a USB Type-C socket 43, a USB Type-C socket 45, a power-up control circuit 46, a diode D41, a diode D42, and a display device 44. An external dual-role port device 40 connects to the USB Type-C socket 43 of the mobile power bank 4 through a USB Type-C connector 401, and a downstream-facing port device 47 connects to the USB Type-C socket 45 of the mobile power bank 4 through a USB Type-C connector 471. The system shown in FIG. 4 is not limited to a mobile power bank. In other embodiments, the system shown in FIG. 4 can be a transition card, a computer apparatus, or any other type of dual-role port device. The power-up control circuits 41 and 46 have the same structure as the power-up control circuit 11 of the embodiment shown in FIG. 1.

Like the mobile power bank 2 shown in FIG. 2, the power-up control circuit 41, the microcontroller 42, the USB Type-C socket 43, and the display device 44 of the mobile power bank 4 correspond to the power-up control circuit 21, the microcontroller 22, the USB Type-C socket 23, and the display device 24 of the mobile power bank 2 respectively. Thus, the mobile power bank 4 can perform all the circuit operations of the mobile power bank 2. Compared with mobile power bank 2, mobile power bank 4 further comprises another power-up control circuit and another USB Type-C socket (that is, the power-up control circuit 46 and the USB Type-C socket 45). In the embodiment, the power-up control circuit 46 and the USB Type-C socket 45 respectively perform the same operations as the power-up control circuit 41 and the USB Type-C socket 43. Thus, the mobile power bank 4 can support two dual-role port devices (the dual-role port device 40 and the dual-role port device 47) at the same time. For example, the mobile power bank 4 can operate to: receive power from the dual-role port device 40 and the dual-role port device 47 at the same time; supply power to the dual-role port device 40 and the dual-role port device 47 at the same time; receive power from the dual-role port device 40 and supply power to the dual-role port device 47; and receive power from the dual-role port device 47 and supply power to the dual-role port device 40.

In the embodiment, compared the mobile power bank 2, the mobile power bank 4 further comprises a bridge transistor 420, a diode 41D, and a diode D42. The microcontroller 42 is electrically connected to the gate of the bridge transistor 420. The microcontroller 42 controls the bridge transistor 420 to decide whether the VBUS pin of the external dual-role port device 40 connects to the VBUS pin of the dual-role port device 47. The diode D41 and the diode D42 are configured to prevent the power provided by one of the two sides (the external dual-role port device 40 and the dual-role port device 47) from being supplied to the other side when the bridge transistor 420 is not turned on, thereby protecting the apparatuses on the two sides.

In the embodiment, if the bridge transistor 420 serves as a bridge element and one of the external dual-role port device 40 and the external dual-role port device 47 serves as a downstream-facing port device (source), once the downstream-facing port device (source) connects to the mobile power bank 4, the microcontroller 42 obtains stable power. At this time, the bridge transistor 420 is turned on.

In the embodiment, if the external dual-role port device 40 serves as an upstream-facing port device (sink) and connects to the mobile power bank 4, the microcontroller 42 only obtains the power required for maintaining the operation but does not turn on the bridge transistor 340. After a downstream-facing port device (source) connects to the mobile power bank 4 and stable power is supplied, then the microcontroller 42 turns on the bridge transistor 420 and controls the external dual-role port device to switch to the downstream-facing port device (source) from the upstream-facing port device (sink) for supplying power.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power-up control circuit connecting to a dual-role port device through a universal serial bus Type-C connection port to keep a microcontroller in a power-up status, the power-up circuit comprising:
   a pull-down resistor having a first terminal and a second terminal, wherein the first terminal of the pull-down resistor is electrically connected to a configuration channel pin of the universal serial bus Type-C connection port;
   a pull-down switch electrically connected to the second terminal of the pull-down resistor and a ground node; and
   an enable device electrically connected to the pull-down switch and the configuration channel pin, wherein the enable device comprises:
      a diode having an anode electrically connected to the configuration channel pin and a cathode electrically connected to a control terminal of the pull-down switch; and
      a capacitor electrically connected between the control terminal of the pull-down switch and the ground node,
   wherein when the enable device is configured to receives a voltage detection signal transmitted by the dual-role port device through the configuration channel pin, the enable device is configured to turn on the pull-down switch to electrically connect the pull-down resistor to the ground node,
   wherein when the voltage detection signal is at a high voltage level, the diode is turned on to charge the capacitor to a first voltage level applied to turn on the pull-down switch, and
   wherein when the voltage detection signal is at a low voltage level, the diode is turned off and a cross voltage of the capacitor keeps on the first voltage level to turn on the pull-down switch.

2. The power-up control circuit as claimed in claim 1, wherein when the pull-down resistor is electrically connected to the ground node, the dual-role port device detects the pull-down resistor through the configuration channel pin and further supplies power to the microcontroller through a power supply pin to keep the microcontroller in the power-up status.

3. The power-up control circuit as claimed in claim 1, further comprising:
   a pull-up resistor electrically connected between the configuration channel pin and the microcontroller.

4. The power-up control circuit as claimed in claim 1, further comprising:
   a first resistor electrically connected between the configuration channel pin and the anode of the diode.

5. The power-up control circuit as claimed in claim 1, wherein the voltage detection signal is a square-wave signal.

6. The power-up control circuit as claimed in claim 1, wherein when the dual-role port device detects the pull-down resistor, the dual-role port device is switched to a downstream-facing port device.

7. A mobile power device comprising:
 a first universal serial bus Type-C connection port comprising a first configuration channel pin and a first power supply pin;
 a microcontroller electrically connected to the first configuration channel pin and the first power supply pin; and
 a first power-up control circuit electrically connected to a first dual-role port device through the first universal serial bus Type-C connection port,
 wherein the first power-up control circuit comprises:
  a first pull-down resistor having a first terminal and a second terminal, wherein the first terminal of the first pull-down resistor is electrically connected to the first configuration channel pin;
  a first pull-down switch electrically connected to the second terminal of the first pull-down resistor and a ground node; and
 a first enable device electrically connected to the first pull-down switch and the first configuration channel pin, wherein the first enable device comprises:
  a first diode having an anode electrically connected to the first configuration channel pin and a cathode electrically connected to a control terminal of the first pull-down switch; and
  a first capacitor electrically connected between the control terminal of the first pull-down switch and the ground node,
  wherein when the first enable device is configured to receive a first voltage detection signal transmitted by the first dual-role port device through the first configuration channel pin, the enable device is configured to turn on the first pull-down switch to electrically connect the first pull-down resistor to the ground node,
  wherein when the first voltage detection signal is at a first high voltage level, the first diode is turned on to charge the first capacitor to a first voltage level applied to turn on the first pull-down switch, and
  wherein when the first voltage detection signal is at a first low voltage level, the first diode is turned off and a cross voltage of the first capacitor keeps on the first voltage level to turn on the first pull-down switch.

8. The mobile power device as claimed in claim 7, wherein when the first pull-down resistor is electrically connected to the ground node, the first dual-role port device detects the first pull-down resistor through the first configuration channel pin and further supplies power to the microcontroller through the first power supply pin to keep the microcontroller in the power-up status.

9. The mobile power device as claimed in claim 7, wherein the first power-up control circuit further comprises:
 a pull-up resistor electrically connected between the first configuration channel pin and the microcontroller.

10. The mobile power device as claimed in claim 7, wherein the first power-up control circuit further comprises:
 a first resistor electrically connected between the first configuration channel pin and the anode of the first diode.

11. The mobile power device as claimed in claim 7, further comprising:
 a battery electrically connected to the microcontroller; and
 a display device electrically connected to the microcontroller,
 wherein when the microcontroller is in the power-up status, the microcontroller controls the display device to show a power level of the battery.

12. The mobile power device as claimed in claim 7, wherein the voltage detection signal is a square-wave signal.

13. The mobile power device as claimed in claim 7, wherein when the first dual-role port device detects the first pull-down resistor, the first dual-role port device is switched to a downstream-facing port device.

14. The mobile power device as claimed in claim 7, further comprising:
 a second universal serial bus Type-C connection port comprising a second configuration channel pin and a second power supply pin; and
 a second power-up control circuit comprising:
  a second pull-down resistor having a third terminal and a fourth terminal, wherein the third terminal of the first pull-down resistor is electrically connected to the second configuration channel pin;
  a second pull-down switch electrically connected to the fourth terminal of the second pull-down resistor and the ground node; and
  a second enable device electrically connected to the second pull-down switch and the second configuration channel pin, wherein the second enable device comprises:
   a second diode having an anode electrically connected to the second configuration channel pin and a cathode electrically connected to a control terminal of the second pull-down switch; and
   a second capacitor electrically connected between the control terminal of the second pull-down switch and the ground node,
   wherein when the second enable device is configured to receive a second voltage detection signal transmitted by a second dual-role port device, which is electrically connected to the second enable device, through the second configuration channel pin, the second enable device is configured to turn on the second pull-down switch to electrically connect the second pull-down resistor to the ground node,
   wherein when the second voltage detection signal is at a second high voltage level, the second diode is turned on to charge the first capacitor to a second voltage level applied to turn on the second pull-down switch, and
   wherein when the second voltage detection signal is at a second low voltage level, the second diode is turned off and a cross voltage of the second capacitor keeps on the second voltage level to turn on the second pull-down switch.

15. The mobile power device as claimed in claim 14, wherein when the second pull-down resistor is electrically connected to the ground node, the second dual-role port device detects the second pull-down resistor through the second configuration channel pin and further supplies power to the microcontroller of the mobile power device through the second power supply pin to keep the microcontroller in the power-up status.

16. The mobile power device as claimed in claim 14, further comprising:
 a bridge switch electrically connected between the first power supply pin and the second power supply pin;
 a third diode having an anode electrically connected to the first power supply pin and a cathode electrically connected to a power input terminal of the microcontroller; and a fourth diode having an anode electrically connected to the second power supply pin and a cathode electrically connected to the power input terminal of the microcontroller, wherein a control terminal of the bridge switch is electrically connected to the microcontroller, and the microcontroller controls the bridge switch to be turned on or off.

* * * * *